(12) United States Patent
Abilay et al.

(10) Patent No.: US 11,245,623 B2
(45) Date of Patent: Feb. 8, 2022

(54) METHOD AND APPARATUS FOR COLLECTING DATA IN NETWORK COMMUNICATION USING CONCEALED USER ADDRESS

(71) Applicant: Samsung Electronics Co., Ltd., Suwon-si (KR)

(72) Inventors: Wilford P Abilay, Makati (PH); Noel Martin T Briones, Paranaque (PH)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/130,575

(22) Filed: Dec. 22, 2020

(65) Prior Publication Data

US 2021/0203600 A1 Jul. 1, 2021

(30) Foreign Application Priority Data

Dec. 26, 2019 (PH) .............................. 1-2019-050295

(51) Int. Cl.
*G06F 15/16* (2006.01)
*H04L 12/715* (2013.01)
(Continued)

(52) U.S. Cl.
CPC .............. *H04L 45/64* (2013.01); *H04L 45/02* (2013.01); *H04L 45/42* (2013.01); *H04L 61/2007* (2013.01); *H04L 63/20* (2013.01)

(58) Field of Classification Search
CPC ..... H04L 45/64; H04L 45/42; H04L 61/2007; H04L 45/02; H04L 63/20
(Continued)

(56) References Cited

U.S. PATENT DOCUMENTS 6,658,568 B1 * 12/2003 Ginter ..................... G06F 21/10
348/E5.006
6,671,818 B1 * 12/2003 Mikurak ................ G06Q 10/06
714/4.21

(Continued)

FOREIGN PATENT DOCUMENTS

CA      2 291 393 C      6/2000

OTHER PUBLICATIONS

ETSI, Next Generation Protocols (NGP); An example of a non-IP network protocol architecture based on RINA design principles, last modified Feb. 2019, ETSI GR NGP 009 V1.1.1.

*Primary Examiner* — Moustafa M Meky
*Assistant Examiner* — Thorne E Waugh
(74) *Attorney, Agent, or Firm* — Jefferson IP Law, LLP

(57) ABSTRACT

A method and an apparatus for collecting data in a network communication are provided. The method includes receiving a request from a local application for a connection to a remote application using a first address which is assigned for Inter Process Communication (IPC) process corresponding to the local application, wherein the IPC process is performed on a Distributed IPC Facility (DIF) layer, storing a routing table that maps the first address of the local application in the DIF layer and an address of the remote application in a network layer, generating a connection between the local application and the remote application using the routing table to conceal a network layer address of the local application, and storing a communication data between the local application and the remote application using the first address of the local application.

20 Claims, 12 Drawing Sheets

(51) Int. Cl.
*H04L 12/717* (2013.01)
*H04L 29/06* (2006.01)
*H04L 29/12* (2006.01)
*H04L 12/751* (2013.01)

(58) Field of Classification Search
USPC .................................................. 709/238
See application file for complete search history.

(56) References Cited

U.S. PATENT DOCUMENTS

| | | | |
|---|---|---|---|
| 7,165,174 B1* | 1/2007 | Ginter | G06F 21/10 |
| | | | 705/51 |
| 7,403,535 B2* | 7/2008 | Modi | H04L 29/12367 |
| | | | 370/401 |
| 7,551,614 B2* | 6/2009 | Teisberg | H04L 29/12009 |
| | | | 370/389 |
| 8,745,269 B2* | 6/2014 | Parekh | H04L 41/12 |
| | | | 709/245 |
| 8,775,391 B2 | 7/2014 | Kalavade | |
| 9,241,044 B2* | 1/2016 | Shribman | H04L 67/32 |
| 9,491,564 B1* | 11/2016 | Raleigh | G06Q 30/0284 |
| 9,584,633 B2 | 2/2017 | Day et al. | |
| 9,639,553 B2* | 5/2017 | Hall | G06F 16/178 |
| 9,900,284 B2 | 2/2018 | Friedman et al. | |
| 11,012,529 B2* | 5/2021 | Shribman | H04L 67/32 |
| 2004/0003054 A1* | 1/2004 | Becker | G06F 9/46 |
| | | | 709/219 |
| 2006/0161680 A1* | 7/2006 | Balsevich | H04L 29/12028 |
| | | | 709/245 |
| 2006/0203804 A1* | 9/2006 | Whitmore | H04L 45/00 |
| | | | 370/352 |
| 2007/0208854 A1* | 9/2007 | Wiryaman | H04L 63/20 |
| | | | 709/225 |
| 2008/0120240 A1* | 5/2008 | Ginter | G06F 21/71 |
| | | | 705/51 |
| 2009/0313690 A1* | 12/2009 | Bichot | H04L 69/14 |
| | | | 726/12 |
| 2011/0275360 A1 | 11/2011 | Sample et al. | |
| 2018/0124013 A1* | 5/2018 | Theogaraj | H04W 12/02 |
| 2018/0262388 A1* | 9/2018 | Johnson | G06Q 10/103 |
| 2020/0311766 A1* | 10/2020 | Shiravi Khozani | |
| | | | G06Q 30/0248 |

* cited by examiner

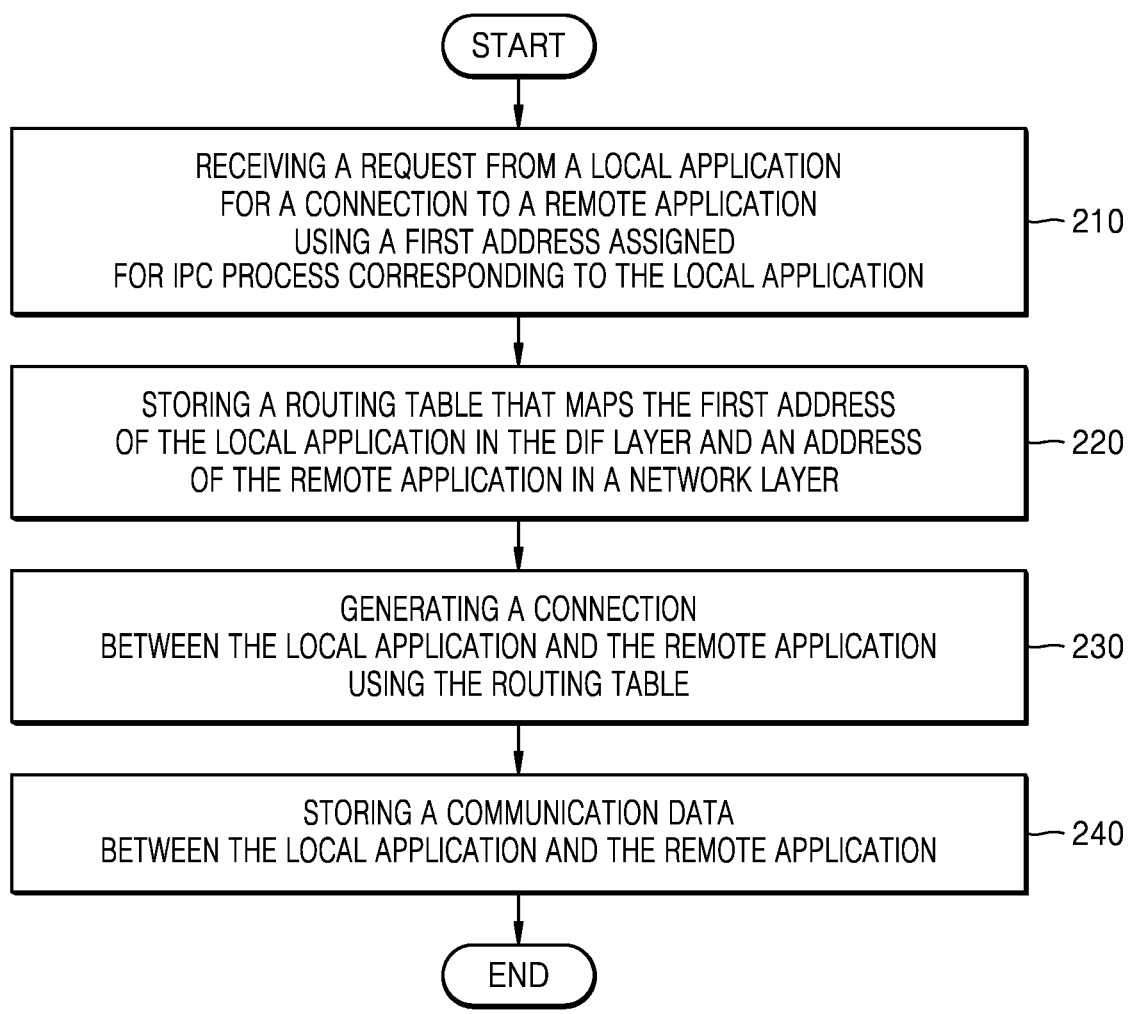

FIG. 4A

| ROUTING TABLE | | | 410 |
|---|---|---|---|
| LOCAL APP NAME | IPC ADDRESS OF LOCAL APP | IP ADDRESS OF REMOTE APP |
| A | 001 | 192.168.X.X |
| AA | 002 | 202.168.X.X |
| ... | ... | ... |

METHOD AND APPARATUS FOR COLLECTING DATA IN NETWORK COMMUNICATION USING CONCEALED USER ADDRESS

CROSS-REFERENCE TO RELATED APPLICATION(S)

This application is based on and claims priority under 35 U.S.C. § 119(a) of a Philippine patent application number 1-2019-050295, filed on Dec. 26, 2019, in the Philippines Intellectual Property Office, the disclosure of which is incorporated by reference herein in its entirety.

BACKGROUND

1. Field

The disclosure relates to a method and an apparatus for collecting data in network communication. More particularly, the disclosure relates to a method and an apparatus for collecting data with concealing user's network layer address by using an address for inter-process communication (IPC) according to recursive internetwork architecture (RINA) instead of using the network layer address.

2. Description of Related Art

The privacy of Internet users is at risk from the websites they visit because websites collect user data for purposes, such as targeted advertising and web analytics using methods that include personal information. Websites are tracked through cookies, browser fingerprinting, web beacons and so on. The tracked information is used, for instance, to send advertising based on one's web browsing history. Moreover, directly observed behavior, such as browsing logs, search queries, or contents of the social networking service (SNS) profile can be automatically processed to infer potentially more intrusive details about an individual. Web tracking methods collect user data by associating such data with personal information, thus putting the privacy of Internet users at risk. For example, an Internet protocol (IP) address associated to a specific user may reveal user's personal information.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for collecting data in network communication.

Another aspect of the disclosure is to provide a computer program product including a computer-readable recording medium having recorded thereon a program for executing the method on a computer. The technical problems of the disclosure are not limited to the aforementioned technical features, and other unstated technical problems may be inferred from embodiments below.

Additional aspects will be set forth in part in the description which follows and, in part, will be apparent from the description, or may be learned by practice of the presented embodiments.

In accordance with an aspect of the disclosure, a method is provided. The method includes receiving a request from a local application for a connection to a remote application using a first address which is assigned for inter process communication (IPC) process corresponding to the local application, wherein the IPC process is performed on a distributed IPC facility (DIF) layer, storing a routing table that maps the first address of the local application in the DIF layer and an address of the remote application in a network layer, generating a connection between the local application and the remote application using the routing table to conceal a network layer address of the local application, storing a communication data between the local application and the remote application using the first address of the local application.

In accordance with another aspect of the disclosure, an apparatus is provided. The apparatus includes a memory configured to store one or more instructions, and at least one processor configured to execute the one or more instructions to receive a request from a local application for a connection to a remote application using a first address which is assigned for Inter IPC process corresponding to the local application, wherein the IPC process is performed on a DIF layer, store a routing table that maps the first address of the local application in the DIF layer and an address of the remote application in a network layer, generate a connection between the local application and the remote application using the routing table to conceal a network layer address of the local application, store a communication data between the local application and the remote application using the first address of the local application.

In accordance with another aspect of the disclosure, a non-transitory recording medium is provided. The non-transitory recording medium includes having recorded thereon a program, which when executed by an apparatus to execute a method of controlling communication in a network, the method includes receiving a request from a local application for a connection to a remote application using a first address which is assigned for IPC process corresponding to the local application, wherein the IPC process is performed on a DIF layer, storing a routing table that maps the first address of the local application in the DIF layer and an address of the remote application in a network layer, generating a connection between the local application and the remote application using the routing table to conceal a network layer address of the local application, and storing a communication data between the local application and the remote application using the first address of the local application.

In accordance with another aspect of the disclosure, a system and method for collecting anonymous user data for analytics using recursive internetwork architecture (RINA) is provided. The system and method includes user data which is collected based on the network activity of the user. A corresponding RINA address is generated and associated to the local application of the user. The collected data is stored in a non-volatile data storage using the corresponding associated RINA address. When RINA address renumbering occurs, data in the non-volatile data storage is re-associated with a new RINA address. The data collector then receives a request for the collected data from an analytics server. The received request is then validated and confirmed if the analytics server is authorized to access the collected data. Once the analytics server is determined to have authorization to access the collected data, data is transmitted to the analytics server.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates a flowchart of a method for collecting data in network communication according to an embodiment of the disclosure;

FIG. 4A illustrates a routing table according to an embodiment of the disclosure;

Throughout the drawings, like reference numerals will be understood to refer to like parts, components, and structures.

DETAILED DESCRIPTION

Figure 1:
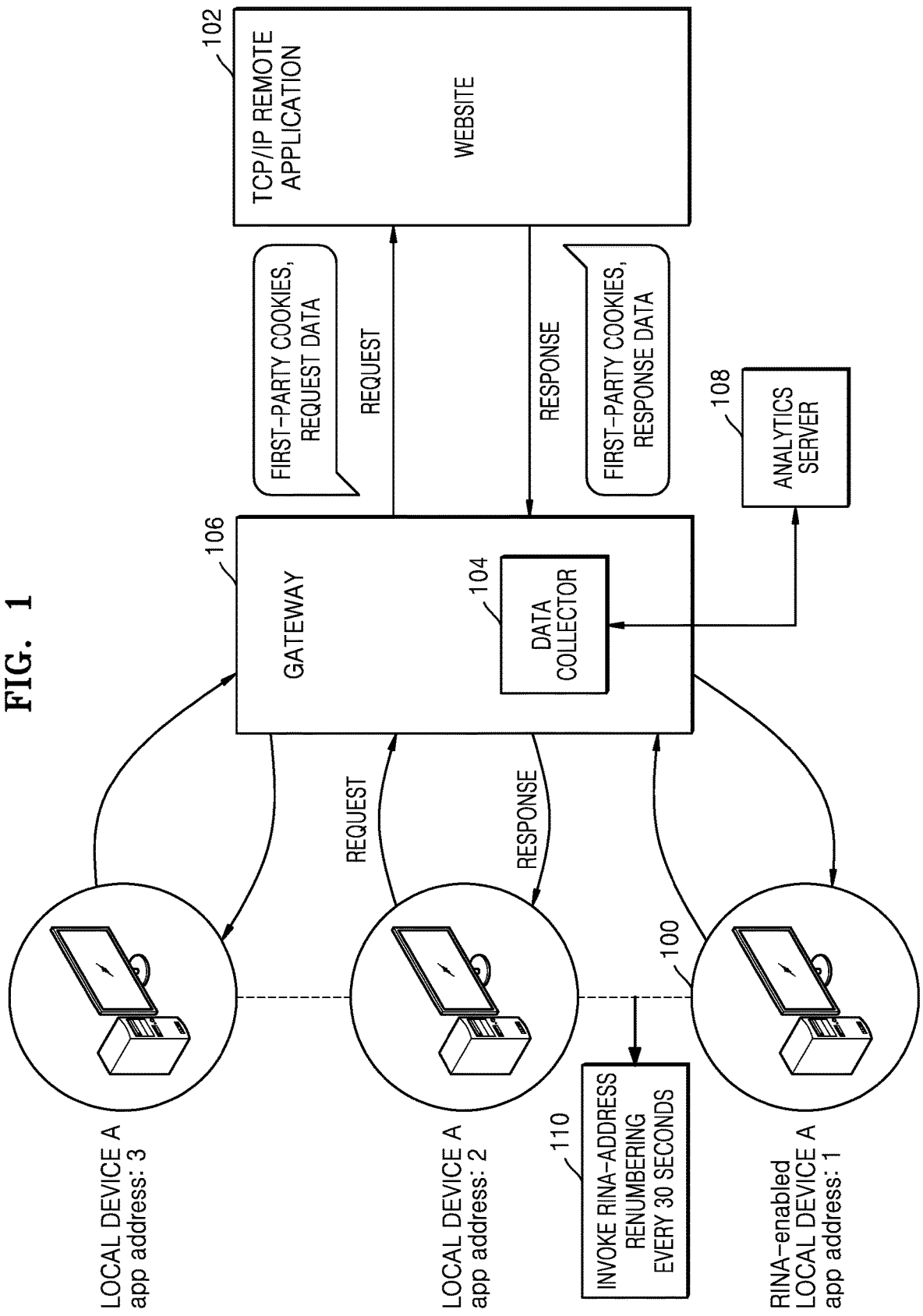
FIG. 1 illustrates a system for collecting anonymous user data in network communication according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a", "an", and "the" include plural references unless the context clearly indicates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

The expression "at least one" modifies the entirety of a list of elements, and does not individually modify the elements. For example, the expression "at least one of A, B or C" indicates only A, only B, only C, both A and B, both B and C, both A and C, all of A, B, and C, or variations thereof.

Although the terms "first", "second", or the like, may be used herein to describe various elements, these elements should not be limited by these terms. These terms are only used to distinguish one element from another element. For example, a first element may be referred to as a second element and, similarly, a second element may be referred to as a first element without departing from the scope of the disclosure. The term "and/or" refers to one of or a combination of at least two of a plurality of listed items.

As used herein, the term "unit" denotes a software element or a hardware element, such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units".

As used herein, inter-process communication (IPC) refers to a communication method by which processes communicate with each other and synchronize operations thereof. In IPC, when two or more processes run at the same time, a shared memory capable of sharing resources may be used. For example, a first process may run and the running result may be stored in the shared memory, and a second process may access the shared memory to use the running result of the first process. In IPC, a message for establishing a communication link from a process to another process may be transmitted. The message may be transmitted between communication links, and a head of the message may be used to determine a receiver and a process to be performed by the receiver.

As used herein, a distributed IPC facility (DIF) refers to a layer including IPC processes in a network system. Throughout the specification, a layer may also be referred to as an entity. DIF layers may perform the same processes with different policies or functions for higher level application processes. At the same time, the higher level application process may correspond to a DIF for a wider scope of services. Two applications with different end-hosts may communicate with each other through a DIF.

As used herein, recursive internetwork architecture or "RINA" refers to a network architecture that is based on IPC. In the RINA, distributed IPC facilities (DIFs) are recursed so it can provide IPC services to each other. Unlike the traditional network architecture that follows the open systems interconnection (OSI) model, every layer does not have a specific functionality and it does not have a fixed number of layers. DIF layers may be stacked as required and may vary depending on the application or processes needed.

Hereinafter, the disclosure will be described by explaining embodiments of the disclosure with reference to the attached drawings. The disclosure may, however, be embodied in many different forms and should not be construed as being limited to the embodiments of the disclosure set forth herein. Specific executions described herein merely correspond to examples, and do not limit the scope of the disclosure in any way. For clarity of explanation, descriptions of general electronic elements, control systems, software, and other functional aspects of the systems may be omitted herein.

Methods of data collection for targeted advertising and web analytics exposes security and privacy risks to internet users due to web tracking activities. For example, a user profile can be created with a user's Internet protocol (IP) address. The profile may contain application content, location, device information, media type, network information, demographics, and psychographics. A profile can be generated and be associated to that IP address. Other web browsing activities exposes the user information through various techniques, such as browser fingerprinting, web beacons, and tracking cookies. These activities expose the user's online identity in a nonconsensual manner which can be used for analytics, personal gain, or malicious purposes.

Meanwhile, other existing protocols do not provide addressing systems that can be used for data collection that keep the user anonymous. named data networking (NDN) does not address hosts or applications at all, as it addresses content. expressive Internet architecture (XIA) uses the hash of public keys to address hosts and services, but it requires said addresses to remain fixed throughout its operation, implying that once said addresses are sniffed, malicious actors can track hosts and services. And in transmission control protocol/internet protocol (TCP/IP), addresses also generally remain fixed, implying the same problem as XIA.

As a result, there is a growing need to address cybersecurity risks and protect users' privacy. The disclosure relates to collect data in the network communication without revealing personal information. According to an embodiment of the disclosure, an IP address assigned to a device or application is concealed to external network by using an address assigned for IPC process according to the RINA instead of IP address. RINA is a network architecture that relies on the premise that regards networking as distributed IPC. RINA decompose networks into layers of generic protocols that can be configured via policies to optimally serve their operational requirement.

In a TCP/IP environment, an essential part for identifying a user's online address is the internet protocol address (IP address) in a network layer. Once a connection is established, TCP handles the communication between two machines with the use of layers (OSI) based on IP address. Network renumbering in the TCP/IP environment is a complicated and expensive procedure that has to be carefully planned and executed to avoid routing, security (firewall, access control list (ACLs)) and transport connection integrity problems. The source of most of these issues is in the lack of a complete naming and addressing architecture in the TCP/IP protocol suite. According to an embodiment of the disclosure, an address assigned for IPC process can be renumbered on-demand within a layer called "DIF" without causing packet loss, and provides an acceptable performance in real-world use cases.

FIG. 1 illustrates a system for collecting data in network communication, according to an embodiment of the disclosure.

Referring to FIG. 1, a router 110 or gateway 104 generates a random address according to RINA ("RINA address"), and provides a randomly generated address to a local application 100. As described below, the RINA address is an address assigned for IPC process (IPCP) corresponding to the local application. The RINA address reflects the location of the IPC process corresponding to the local application within DIF. The RINA address may be temporary, its scope is the DIF. Router 110 or gateway 104 may invoke RINA address renumbering process periodically. In other words, a random address according to RINA may be generated for every predetermined time. For example, the RINA address renumbering process may be set for every 30 seconds. Referring to FIG. 1, a first RINA address of the local application 100 executed in local device A is firstly "1", then changed into "2" after 30 seconds, and then changed into "3" after 30 seconds. Local application 100 can be identified by using the associated RINA address. Next, the local application 100 sends a request to a remote application 102 using the currently assigned RINA address. Then, the request data from the local application 100 is obtained by the data collector 104 and is stored in non-volatile storage of the data collector 104. The data collector 104 may be implemented in the gateway 106 or the data collector 104 may be implemented separately from the gateway 106. Next, the data collector 104 receives a request from the analytics server 108 and determines whether the analytics server 108 is authorized to access the data. In case that the analytics server 108 is authorized to access the data, the data is transmitted to the analytics server 108.

According to an embodiment of the disclosure, the communication between the local application 100 and the gateway 106 is performed based on the RINA address instead of IP address of the local application 100. The data collected at the gateway 106 or at the data collector 104 does not include the IP address of the local application 100 because the communication between the local application 100 and the gateway 106 is performed based on the RINA address as the identifier of the user data. Thus, the IP address of the local application 100 is hidden from outside of the DIF layer. The analytics server 108 is configured to interpret and analyze big data and return valuable results that can be used for business area needs, such as targeted advertising, predictive analytics, artificial intelligence (AI), or the like. According to an embodiment of the disclosure, the local application 100, and router 110 are connected to each other according to RINA. The gateway 106 may operate on DIF layer which is implemented in an upper layer of a TCP/IP. The local application 100 uses RINA API directly or the local application 100 may use existing socket APIs and the operating system translates those socket API calls to RINA API calls.

FIG. 2 illustrates a flowchart of a method for collecting data in network communication according to an embodiment of the disclosure. The method for collecting data in network communication between the local application and the remote application may be performed in an apparatus, such as the gateway 106 or the data collector 104, but is not limited thereto. Hereinafter, it is assumed that the gateway 106 performs collecting data in network communication between the local application and the remote application, but is not limited thereto.

The local application having a first address assigned for Inter Process Communication (IPC) process corresponding to the local application, sends a request for a connection to a remote application. The IPC process is performed on a DIF layer. The network is a distributed application that provides IPC services to instances of other distributed applications, called Distributed IPC Facility (DIF). The RINA network protocol architecture features a single type of layer (DIF) that repeats as many times as need by the network. Thus, there may exists multiple instances of the DIF, dealing with different scopes and providing services to each other. The DIF may provide IPC services between the local application and the gateway. The local application is registered to the DIF layer by binding a local application name with an address for the IPC process, and the binding relation is disseminated via the DIF layer. This binding relation is called directory in RINA.

Referring to FIG. 2, in operation 210, the gateway 106 receives the request from the local application 100. The gateway 106 maps the IPC address corresponding to the local application 100 to the IP address of the remote application 102. In operation 220, the gateway 106 stores a routing table that maps the first address of the local application 100 in the DIF layer and an address of the remote application 102 in a network layer, such as the IP address. Routing table may include local application name, an address assigned for the IPC corresponding to the local application, and the IP address of the remote application 102.

FIG. 4A illustrates a routing table according to an embodiment of the disclosure.

Referring to FIG. 4A, for example, when the gateway 106 receives the request from the local application (A) for a connection to a remote application having IP address "192.168.x.x", then the gateway 106 stores a mapping relationship between the IPC address corresponding to the local application and the IP address of the remote application. The local application is identified using the IPC address instead of IP address of the local application. The address assigned for Inter Process Communication (IPC) process corresponding to the local application may be temporary, and it may change periodically. Thus, the gateway 106 determines whether the first address assigned to the local application is changed, and in case that the first address assigned to the local application is changed to a second address, the gateway 106 updates a routing table 410 by replacing the first address into the second address.

Referring to FIG. 2, in operation 230, the gateway 106 generates a connection between the local application and the remote application using the routing table to conceal a network layer address of the local application. In operation 240, the gateway 106 stores a communication data between the local application and the remote application using the first address of the local application.

Figure 4B:
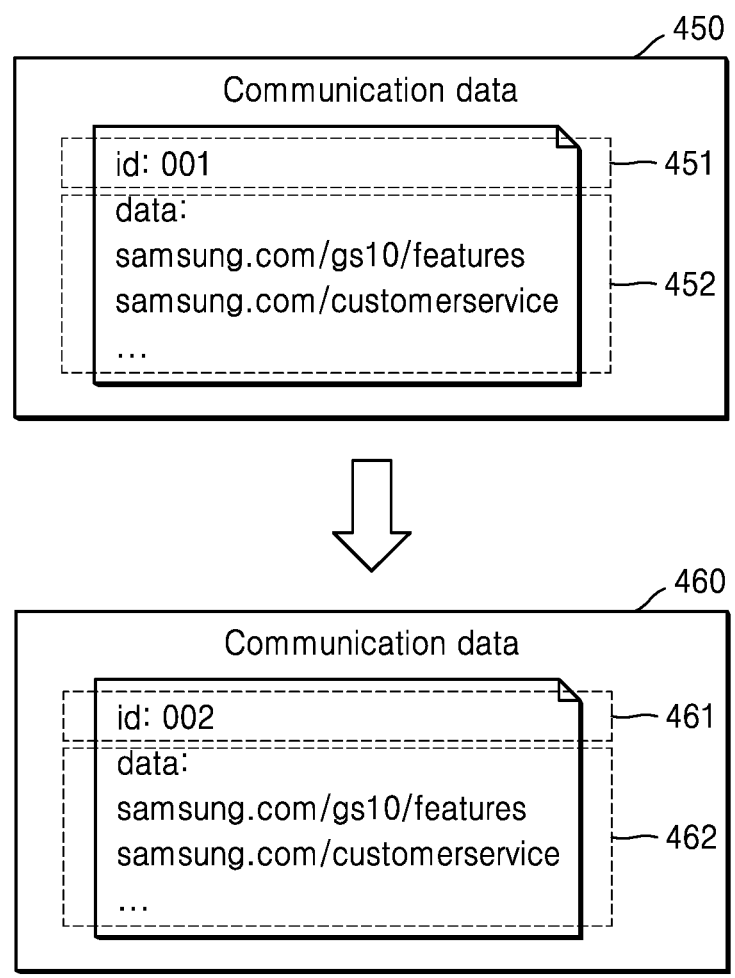
FIG. 4B illustrates a communication data collected in network communication according to an embodiment of the disclosure.

FIG. 4B illustrates a communication data collected in network communication according to an embodiment of the disclosure.

Referring to FIG. 4B, communication data (450, 460) may include an address (451, 461) assigned for the IPC corresponding to the local application, and the requested data (452, 462) from the local application to the remote application. The requested data may include any one or any combination of a hyperlink, a uniform resource locator (URL), a uniform resource name (URN), and any data transfer request from the local application to the remote application. The address assigned for Inter Process Communication (IPC) process corresponding to the local application may be temporary, and it may change periodically. Thus, the gateway 106 determines whether the first address 451 assigned to the local application is changed, and in case that the first address 451 assigned to the local application is changed to a second address 461, the gateway 106 updates a portion of the communication data 450 associated with the first address 451 by replacing the first address 451 into the second address 461.

When the gateway 106 receives a request for an access to the communication data from an external application, the gateway 106 determines whether the external application is authorized to have access to the communication data. In case that the external application is authorized to have access to the communication data, the gateway 106 transmits the communication data to the external application.

Figure 3A:
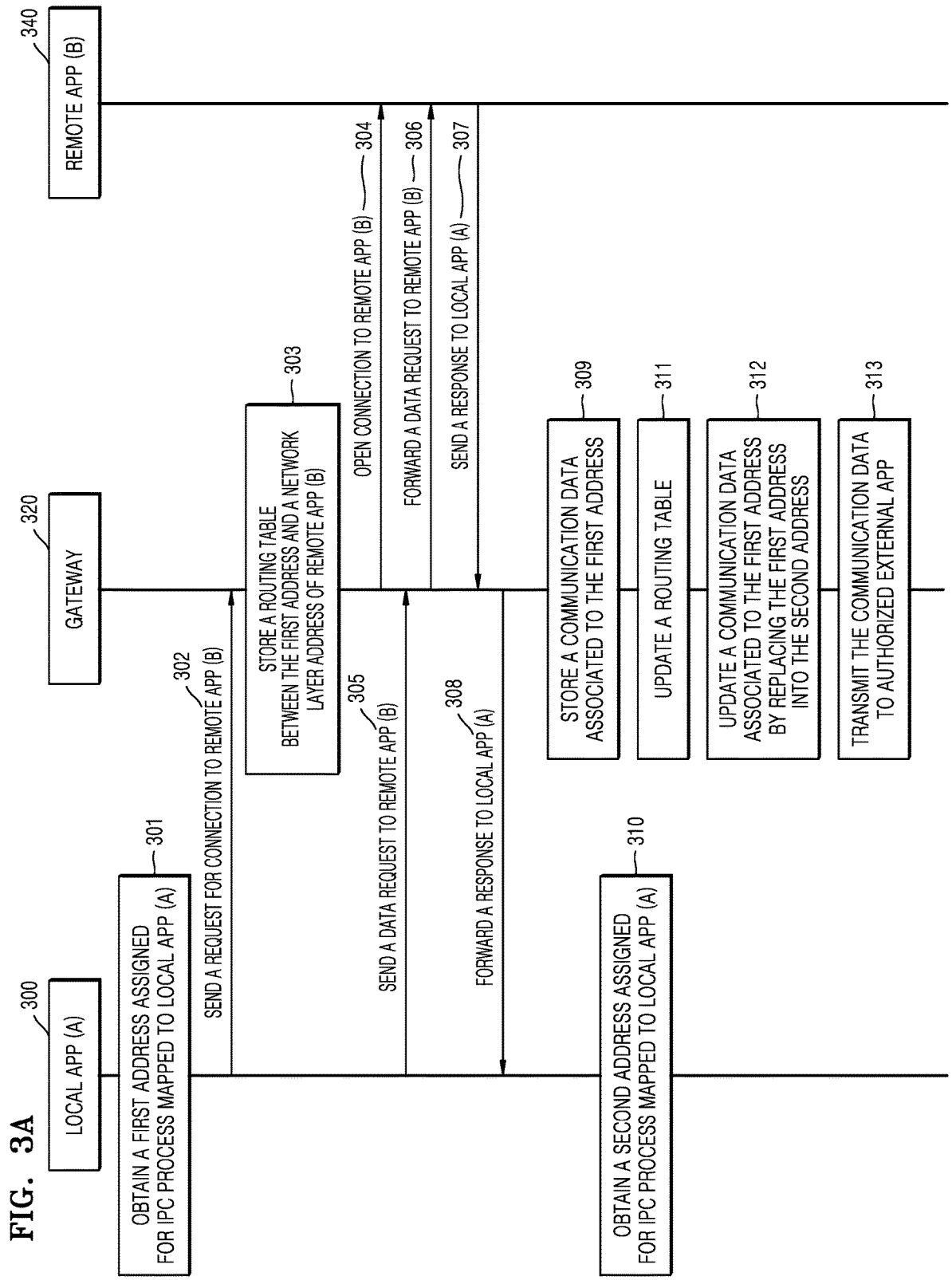
FIG. 3A illustrates a flowchart of a method for collecting data among a local application, a gateway, and a remote application in network communication according to an embodiment of the disclosure.

FIG. 3A illustrates a flowchart of a method for collecting data among a local application, a gateway, and a remote application in network communication according to an embodiment of the disclosure.

Referring to FIG. 3A, in operation 301, the local application 300 having a name of "A" obtains a first address assigned for IPC process mapped to the local application 300. In operation 302, the local application 300 having the first address assigned for IPC process corresponding to the local application 300, sends a request for a connection to a remote application 340 having a name of "B" using an a network layer address of the remote application 340, such as URL or IP address. The local application 300 is identified using the first address assigned for IPC process corresponding to the local application 300 instead of the IP address of the local application 300. Thus, the IP address is hidden to the external network. The gateway 320 may obtain IP address corresponding to URL of the remote application 340 from Domain Name System (DNS).

In operation 303, the gateway 320 receives the request from the local application 300, then stores a routing table between the first address of the local application 300 and the network layer address of remote application 340. In operation 304, the gateway 320 opens connection from the local application 300 to the remote application 340. After the connection from the local application 300 to the remote application 340 is established, the local application 300 send a data request to the remote application 340 in operation 305. The gateway 320 forwards the data request to the remote application 340 to the gateway 320 in operation 306. The remote application 340 send a response to the local application 300 through the gateway 320 in operation 307 and 308.

The gateway 320 stores a communication data between the local application 300 and the remote application 340 using the first address of the local application in operation 309. The communication data may include an address currently assigned for the IPC corresponding to the local application 300, and the requested data. The requested data may include any one or any combination of a hyperlink, a uniform resource locator (URL), a uniform resource name (URN), and any data transfer request from the local application 300 to the remote application 340. The address assigned for Inter Process Communication (IPC) process corresponding to the local application may be temporary, and it may change periodically. Thus, a first address assigned to the IPC process corresponding to the local application 300 may change into a second address. In this case, the local application 300 obtains a second address assigned for IPC process in operation 310. When the address for IPC process is changed, the changed address is disseminated via the DIF layer, so the gateway 320 obtains the second address assigned to the IPC process corresponding to the local application 300. In operation 311, the gateway 320 determines whether the first address assigned to the local application 300 is changed, and in case that the first address assigned to the local application 300 is changed to a second address, the gateway 320 updates a routing table by replacing the first address into the second address. In operation 312, the gateway 320 updates a portion of the communication data associated with the first address by replacing the first address into the second address. When the gateway 320 receives a request for an access to the communication data from an external application, the gateway 320 determines whether the external application is authorized to have access to the communication data. In case that the external application is authorized to have access to the communication data, the gateway 320 transmits the communication data to the external application in operation 313.

Figure 3B:
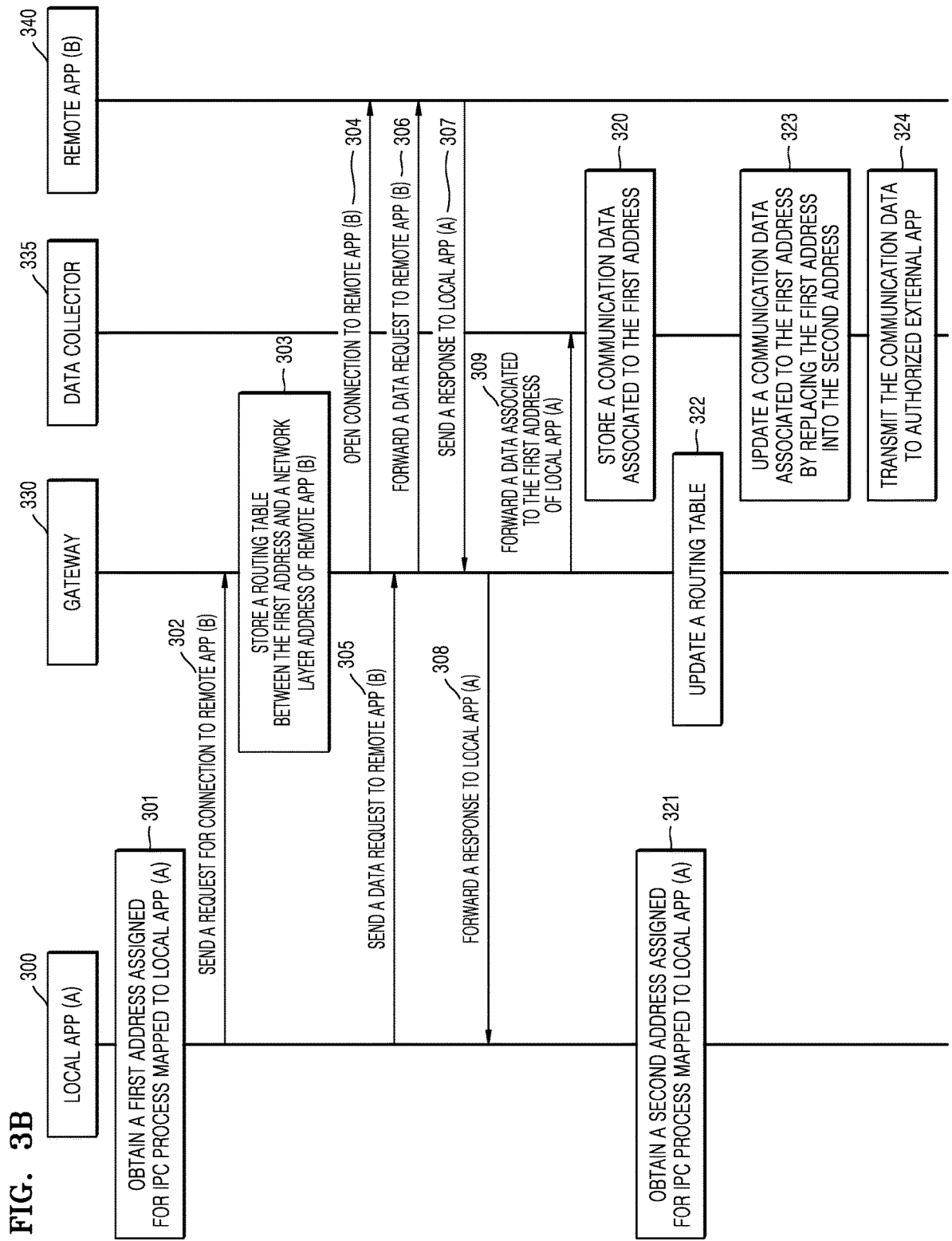
FIG. 3B illustrates a flowchart of a method for collecting data among a local application, a gateway, a data collector, and a remote application in network communication according to an embodiment of the disclosure.

FIG. 3B illustrates a flowchart of a method for collecting data among a local application, a gateway, a data collector, and a remote application in network communication according to an embodiment of the disclosure. Operations 301~308 among the local application 300, gateway 330, and the remote application 340 of FIG. 3B are same with the operations 301~308 among the local application 300, gateway 320, and the remote application 340 of FIG. 3A.

Referring to FIG. 3B, a communication data between the local application 300 and the remote application 340 is obtained by a data collector 335 implemented separately from the gateway 330. The gateway 330 forwards a data associated to the first address of local application 300 to the data collector 335 in operation 309. The data collector 335 stores a communication data between the local application 300 and the remote application 340 using the first address of the local application in operation 320. The address assigned for IPC process corresponding to the local application may be temporary, and it may change periodically. Thus, a first address assigned to the IPC process corresponding to the local application 300 may change into a second address. In this case, the local application 300 obtains a second address assigned for IPC process in operation 321. When the address for IPC process is changed, the changed address is disseminated via the DIF layer, so the gateway 330 obtains the second address assigned to the IPC process corresponding to the local application 300. In operation 322, the gateway 330 determines whether the first address assigned to the local application 300 is changed, and in case that the first address assigned to the local application 300 is changed to a second address, the gateway 330 updates a routing table by replacing the first address into the second address. In operation 323, the data collector 335 updates a portion of the communication data associated with the first address by replacing the first address into the second address. When the data collector 335 receives a request for an access to the communication data from an external application, the data collector 335 determines whether the external application is authorized to have access to the communication data. In case that the external application is authorized to have access to the communication data, the data collector 335 transmits the communication data to the external application in operation 324.

Figure 5:
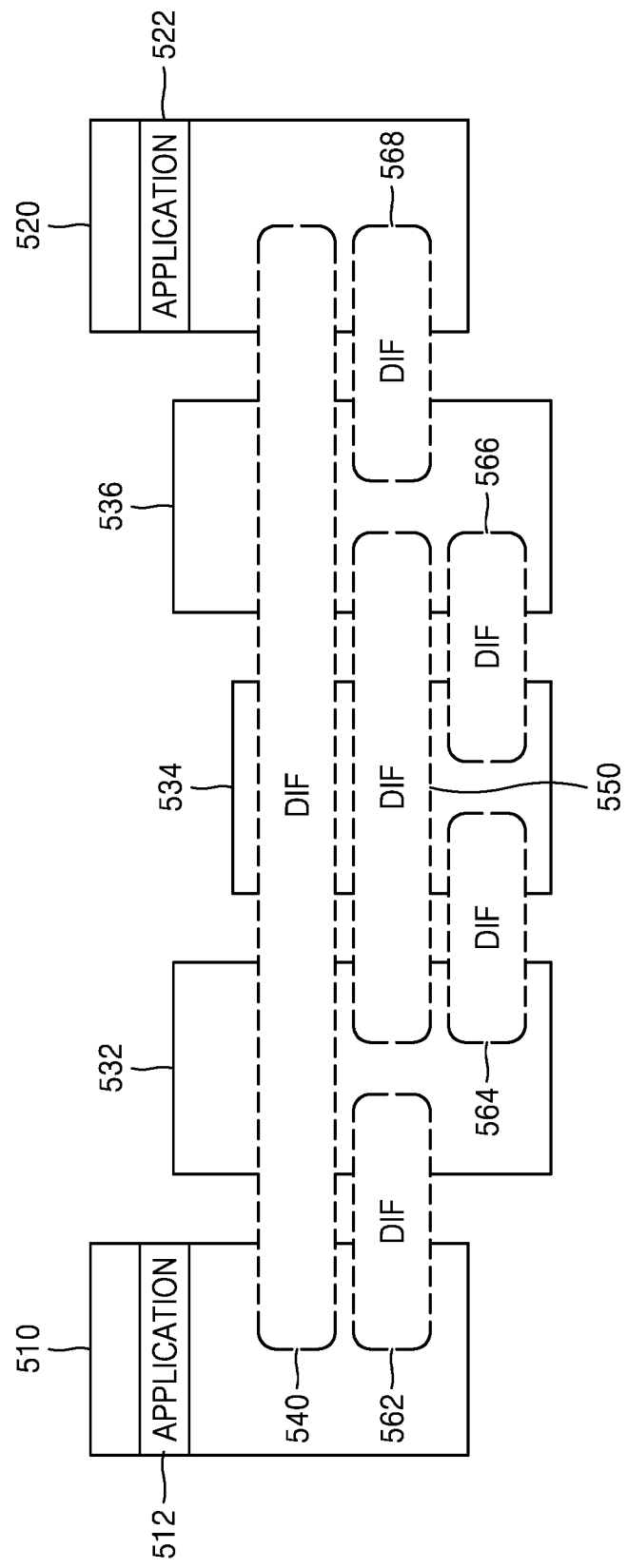
FIG. 5 is a block diagram for describing a recursive internetwork architecture (RINA) according to an embodiment of the disclosure.

FIG. 5 is a block diagram for describing a recursive internetwork architecture (RINA) according to an embodiment of the disclosure.

Referring to FIG. 5, an application 512 may use a RINA network including one or more DIFs 540, 550, 562, 564, 566, and 568, to communicate with another application 522 on the RINA network. According to an embodiment of the disclosure, the RINA is one of IPC models and may be an architecture including a single recurring set of layers called distributed IPC facilities or DIFs. A network designer may design the network with a desired number of DIFs. Unlike an existing network architecture in which a layer is determined in units of a module, the RINA network may use a desired number of DIFs performing the same function in different ranges. According to an embodiment of the disclosure, the RINA may include nodes, such as hosts 510 and 520, area border routers 532 and 536, and an internal router 534, but is not limited thereto. For example, a high-level DIF 540 may be directly connected to the two hosts 510 and 520. Each of low-level DIFs 562, 564, 566, and 568 may be connected via a host and a router, or connected between a plurality of routers. The low-level DIFs 562, 564, 566, and 568 may serve as a firewall for enhancing security in communication on the RINA network. The two hosts 510 and 520 may be the local device A and the gateway 106 of FIG. 1, respectively.

Figure 6:
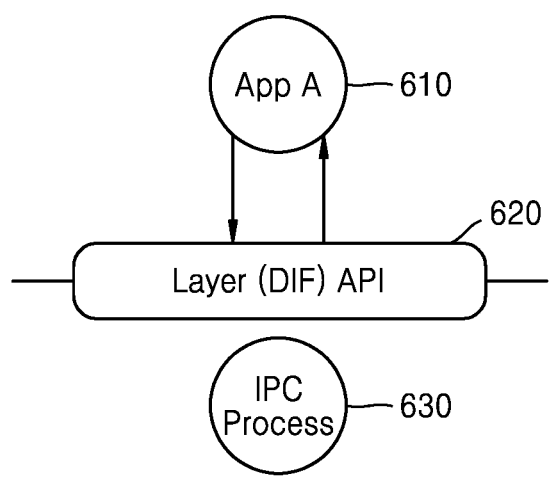
FIG. 6 illustrates a relationship among an application, a distributed inter process communication (IPC) facility (DIF) layer and IPC process according to an embodiment of the disclosure.

FIG. 6 illustrates a relationship among an application, a DIF layer and IPC process according to an embodiment of the disclosure.

Referring to FIG. 6, DIF 620 itself is just a distributed application that performs and manages IPC. The application processes that are members of a DIF are called IPC Processes (IPCPs). In order for an application A 610 to be reachable via a certain DIF 620, it has to register to the DIF 620. Registration creates a local binding between the application A 610 and the IPC Process 630 it is registering to. This binding is disseminated through the DIF 620 via a DIF directory update that maps the registered name of the application A 610 to the address of the IPCP through which it is available. Furthermore, addressing for a network requires at least an application name, a node address, and a point of attachment address. Directory maps application names to node addresses, routes are sequences of node addresses, and multiple paths between adjacent nodes require mappings between node addresses and point of attachment addresses.

Figure 7:
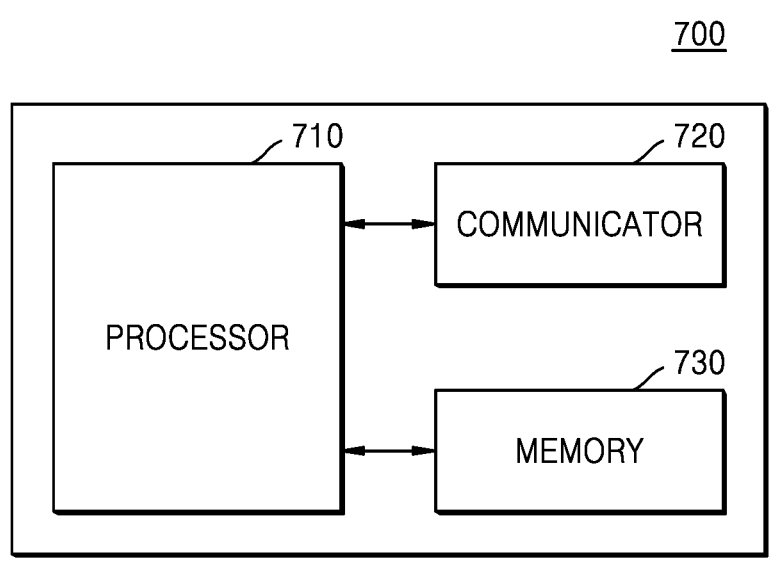
FIG. 7 is a block diagram of an apparatus according to an embodiment of the disclosure.

FIG. 7 is a block diagram of an apparatus according to an embodiment of the disclosure.

Referring to FIG. 7, an apparatus 700 may include a processor 710, a communicator 720, and a memory 740. However, the apparatus 700 may include additional or fewer elements compared to those illustrated in FIG. 7.

In an embodiment of the disclosure, the processor 710 may control overall operations of the apparatus 700 and include at least one processor, such as a central processing unit (CPU) or a graphics processing unit (GPU). The processor 710 may control the other elements of the apparatus 700 to perform operations for operating the apparatus 700. For example, the processor 710 may execute a program stored in, read a file stored in, or store a new file in the memory 730. In an embodiment of the disclosure, the processor 710 may perform operations for operating the apparatus 700, by executing a program of computer-readable instructions or computer-readable code stored in the memory 730. For example, the processor 710 may receive a request from a local application for a connection to a remote application using a first address which is assigned for Inter Process Communication (IPC) process corresponding to the local application, store a routing table that maps the first address of the local application in the DIF layer and an address of the remote application in a network layer, generate a connection between the local application and the remote application using the routing table to conceal a network layer address of the local application, and store a communication data between the local application and the remote application using the first address of the local application.

In an embodiment of the disclosure, the communicator 720 may allow the electronic device 700 to communicate with another electronic device through the communicator 720 in a wired or wireless manner. The communicator 720 may include one or more elements for enabling communication with an external server requesting the communication data between the local application and the remote application.

In an embodiment of the disclosure, the memory 730 may store various data, programs, or applications for driving and controlling the apparatus 700. The program stored in the memory 730 may include one or more instructions. The program (e.g., one or more instructions) or application stored in the memory 730 may be executed by the processor 710. The memory 730 may store data input to or to be output from the apparatus 700. The processor 710 may access and use the data stored in the memory 730, or store new data in the memory 730.

Figure 8:
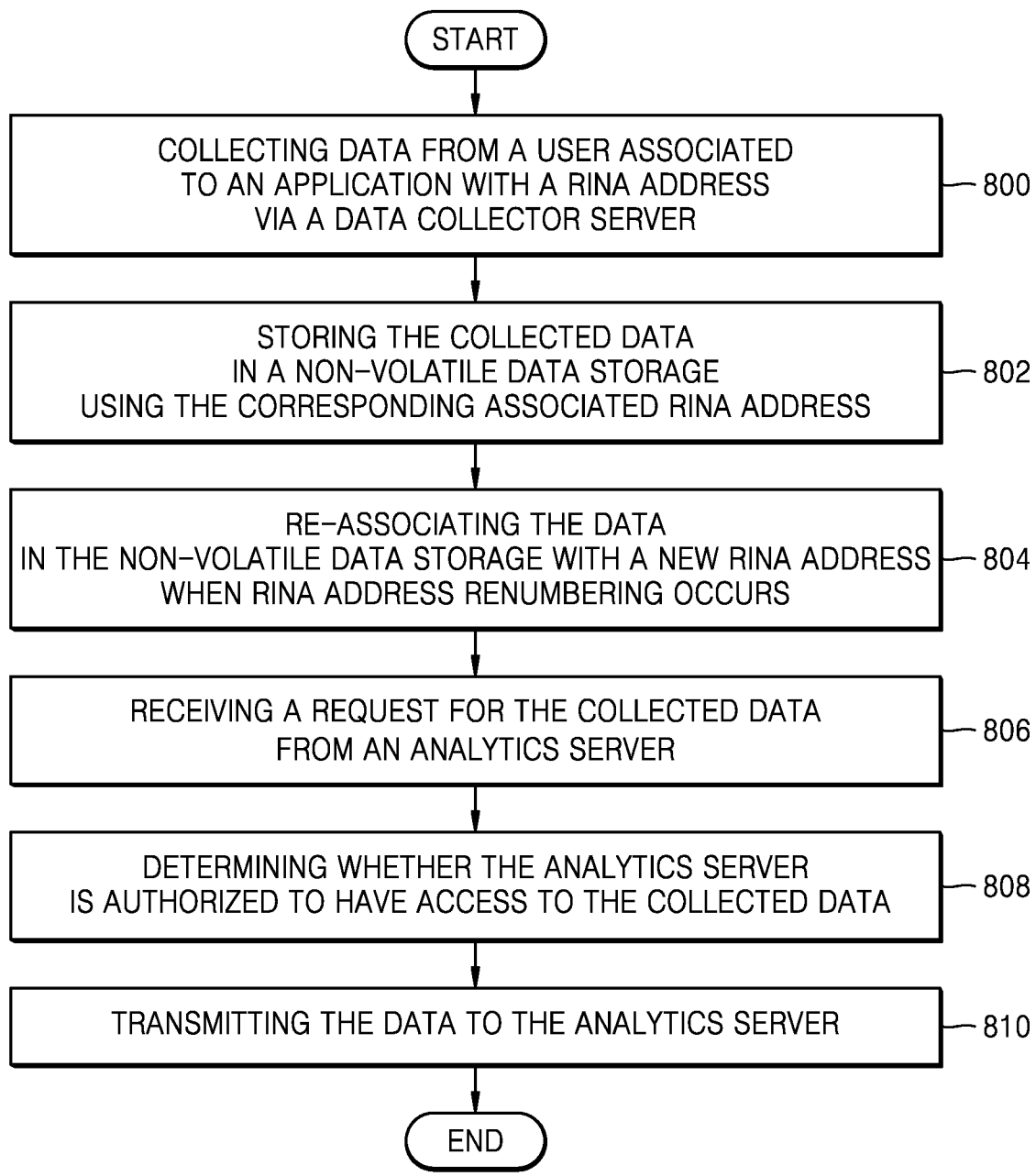
FIG. 8 illustrates a flowchart of a method for collecting anonymous user data for analytics using RINA according to an embodiment of the disclosure.

FIG. 8 illustrates a flowchart of a method for collecting anonymous user data for analytics using RINA according to an embodiment of the disclosure.

Referring to FIG. 8, user data is collected at the gateway or at the data collector based on the network activity of the user in operation 800. A corresponding RINA address is generated and associated to the local application of the user in operation 802. The collected data is stored in a non-volatile data storage using the corresponding associated RINA address in operation 804. When RINA address renumbering occurs, data in the non-volatile data storage is re-associated with a new RINA address in operation 806. The gateway or the data collector then receive a request for the collected data from an analytics server in operation 808. The received request is then validated and confirmed if the analytics server is authorized to access the collected data. Once the analytics server is determined to have authorization to access the collected data, data is transmitted to the analytics server in operation 810.

Figure 9:
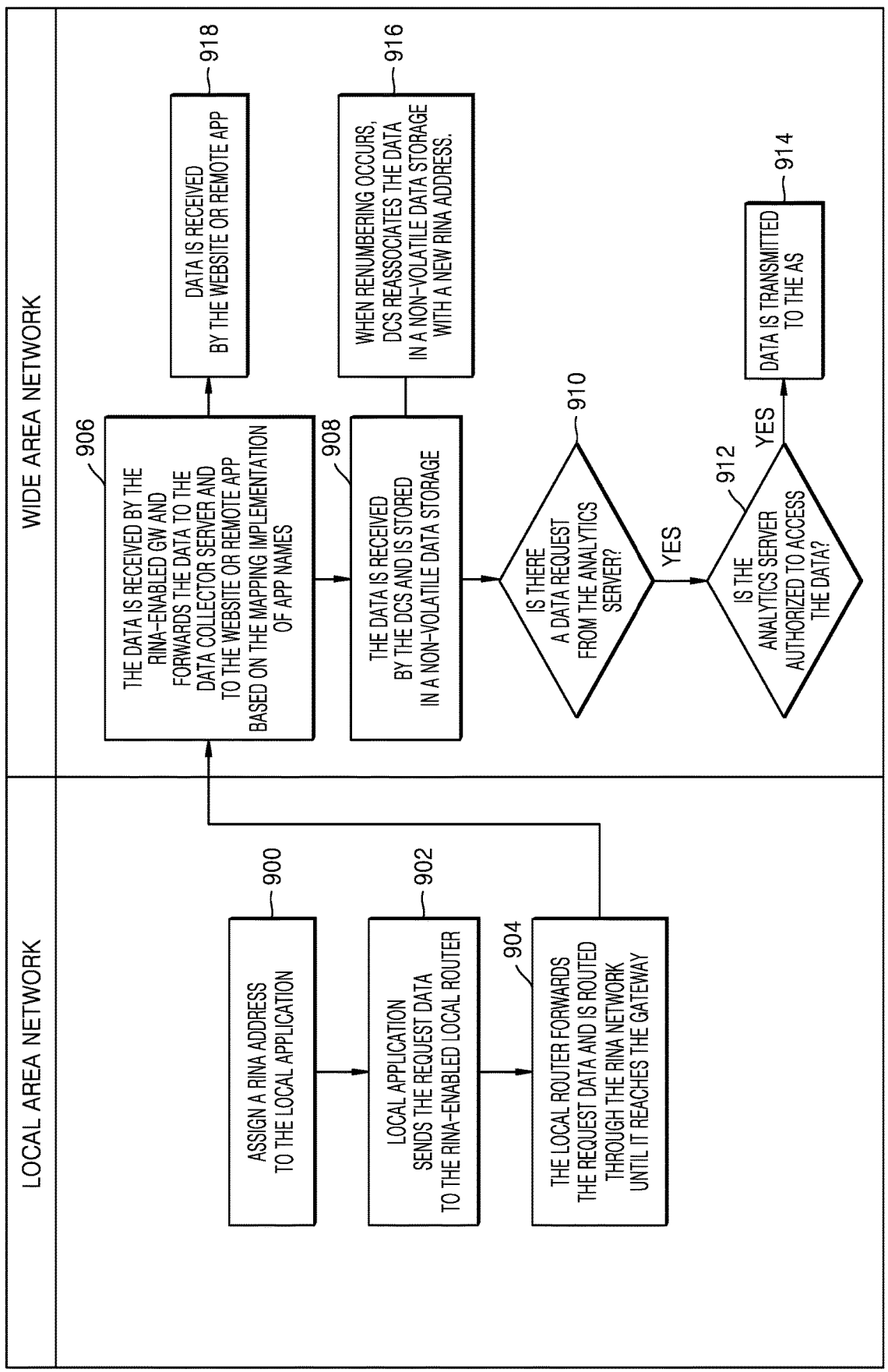
FIG. 9 illustrates a request flow according to an embodiment of the disclosure.

FIG. 9 illustrates a request flow according to an embodiment of the disclosure.

Referring to FIG. 9, a RINA address is assigned to the local application in operation 900. When a user opens a web browser and logs into a website, the local application then sends that request to the local RINA-enabled router in operation 902. Then, the router forwards that request which will then be routed through a RINA network until it reaches the gateway in operation 904. Once it reaches the gateway, the gateway forwards the request data to the corresponding website or remote application and the gateway forwards the data to the data collector server where the request data is received and stored in a non-volatile data storage in operation 906. The forwarded data is based on the mapping implementation of application names from the perspective of a DIF (since the architecture recurses, the same type of relationships and concepts are valid for every single DIF). Applications that wish to be reachable via a certain DIF register to that DIF via its application name. The IPCP at that system creates a mapping between the application name and the IPCP address.

In the case where the data is forwarded to the Data Collector Server (DCS), once the data is received by the DCS and is stored in a non-volatile data storage in operation 908, the DCS will respond to data access requests made by the Analytics Server (AS) in operation 910. If there is a data request made from the AS and if the AS is authorized to access the data in operation 912, the DCS will transmit the data to the AS in operation 914. When renumbering occurs, DCS associates the data in a non-volatile data storage with the new RINA address in operation 916.

In the case where the data is forwarded to the remote app or website, the flow ends once the data is received by the remote app or website in operation 918.

Figure 10:
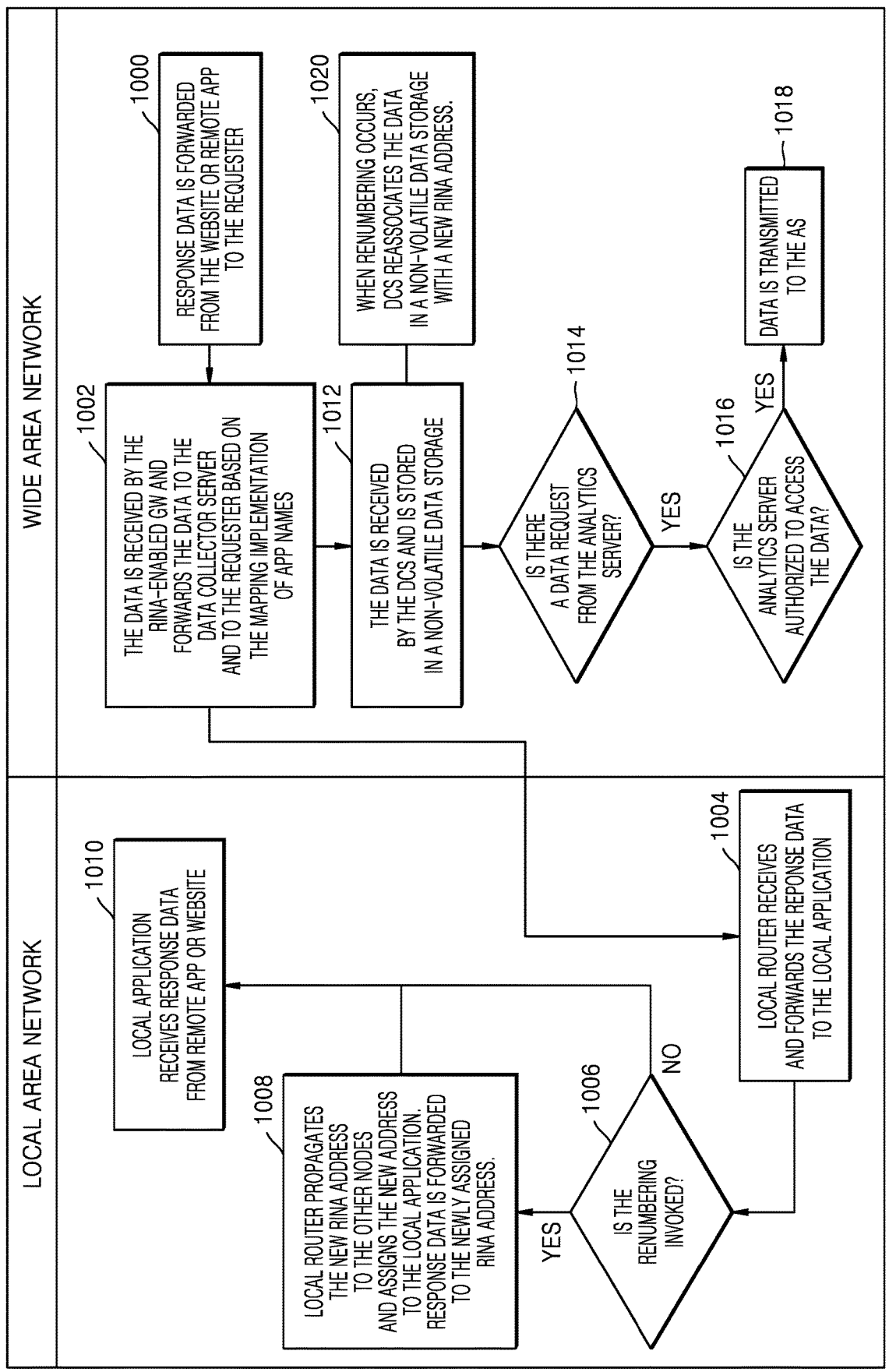
FIG. 10 illustrates another request in a case of RINA renumbering according to an embodiment of the disclosure.

FIG. 10 illustrates another request in a case of RINA renumbering according to another embodiment of the disclosure.

Referring to FIG. 10, when the website sends the response data back to the requester in operation 1000, the response data is forwarded from the website to the gateway. The gateway then forwards the response back to the local app and to the DCS based on the mapping implementation of RINA address and IP addresses in operation 1002. The response is routed through the RINA network until it reaches the local router. The local router receives that response and forwards the response to the local application in operation 1004. A decision is encountered at this point. The local router determines whether a renumbering is required for the local application in operation 1006. If the renumbering is required, the local router invokes the RINA address renumbering and will propagate the new RINA address of the local application to the other network nodes in operation 1008. The response data is forwarded to the newly assigned RINA address of the local application. Finally, the local application receives the response data from the remote application in operation 1010.

In the case where the response data is forwarded to the Data Collector Server, once the data is received by the DCS and is stored in a non-volatile data storage in operation 1012, the DCS will determine whether there is a data access request made by the Analytics Server in operation 1014. If there is a data request made from the AS and if the AS is authorized to access the data in operation 1016, the DCS will transmit the data to the AS in operation 1018. When renumbering occurs, DCS associates the data in a non-volatile data storage with the new RINA address in operation 1020.

Embodiments of the disclosure may be implemented in the form of a computer-readable recording medium including instructions executable by a computer, e.g., a program module executed by a computer. The computer-readable recording medium may be an arbitrary available medium accessible by a computer, and examples thereof include all volatile, non-volatile, detachable, and non-detachable media. The computer-readable recording medium may include a computer storage medium. Examples of the computer storage medium include all volatile, non-volatile, detachable, and non-detachable media implemented using an arbitrary method or technology for storing information, such as computer-readable instructions, data structures, program modules, or other data.

Embodiments of the disclosure may be implemented as software programs including instructions stored in computer-readable storage media.

A computer that is a device for fetching instructions stored in a storage medium and performing an operation according to the fetched instructions may include an electronic device according to embodiments of the disclosure.

A computer-readable storage medium may be provided as a non-transitory storage medium. When a storage medium is 'non-transitory', it means that the storage medium does not include a signal and is tangible, and it does not limit that data is semi-permanently or temporarily stored in the storage medium.

In addition, a control method according to embodiments of the disclosure may be included and provided in a computer program product. The computer program product may be traded between a seller and a buyer.

The computer program product may include a software program and a computer-readable storage medium storing a software program. For example, the computer program product may include a product (e.g., a downloadable application) that is electronically distributed in the form of a software program through a device manufacturer or an electronic market (e.g., Google Play Store or App Store). For electronic distribution, at least a part of the software program may be stored in a storage medium or be temporarily created. In this case, the storage medium may be a server of the manufacturer, a server of the electronic market, or a storage medium of a relay server that temporarily stores the software program.

The computer program product may include a storage medium of a server or a storage medium of a device in a system including the server and the device. Otherwise, when a third device (e.g., a smartphone) communicating with the server or the device is present, the computer program product may include a storage medium of the third device. Alternatively, the computer program product may include a software program itself transmitted from the server to the device or the third device, or from the third device to the device.

In this case, one of the server, the device, and the third device may perform the method according to embodiments of the disclosure, by executing the computer program product. Alternatively, two or more of the server, the device, and the third device may perform the method according to embodiments of the disclosure, by executing the computer program product.

For example, the server (e.g., a cloud server or an artificial intelligence (AI) server) may control the device connected to the server, to perform the method according to embodiments of the disclosure, by executing the computer program product stored in the server.

As another example, the third device may control the device connected to the third device, to perform the method according to embodiments of the disclosure, by executing the computer program product. When the third device executes the computer program product, the third device may download the computer program product from the server and execute the downloaded computer program product. Alternatively, the third device may perform the method according to embodiments of the disclosure, by executing the computer program product provided in a preloaded state.

As used herein, a suffix "unit" or "---er/or" may indicate a hardware component, such as a processor or a circuit, and/or a software component executed by the hardware component, such as the processor.

According to an embodiment of the disclosure, by simplifying and integrating a whole network topology into a single network, a high bandwidth provided by a physical layer, such as an Ethernet layer may be more effectively used.

Furthermore, according to an embodiment of the disclosure, an electronic device may easily exchange information with another electronic device.

In addition, according to an embodiment of the disclosure, by using a security mechanism inherent in a network design, rather than a specific security mechanism, security may be enhanced using a dynamically assigned port and address without using a known port or a public address.

Besides, according to an embodiment of the disclosure, costs for communication between devices may be reduced by implementing a network through simple wiring using a physical layer, such as an Ethernet layer.

Additional aspects, features, and advantages of embodiments of the disclosure will be more apparent from the aforementioned descriptions taken in conjunction with the accompanying drawings.

The above descriptions of the disclosure are provided for the purpose of illustration, and it will be understood by one of ordinary skill in the art that various changes in form and details may be made therein without departing from the scope of the disclosure. Therefore, it should be understood that embodiments of the disclosure described herein should be considered in a descriptive sense only and not for purposes of limitation. For example, each component described to be of a single type can be implemented in a distributed manner and, likewise, components described as being distributed can be implemented in a combined manner.

While the disclosure has been shown and described with reference to various embodiments thereof, it will be understood by those skilled in the art that various changes in form and details may be made without departing from the spirit and scope of the disclosure as defined by the appended claims and their equivalents.

What is claimed is:

1. A method comprising:
assigning a first address for inter process communication (IPC) process to a local application, the first address being used as an identifier of the local application instead of an IP address of the local application;
receiving a request from a local application for a connection to a remote application using the first address corresponding to the local application;
storing a routing table that maps the first address of the local application and an address of the remote application in a network layer;
generating a connection between the local application and the remote application using the routing table to conceal a network layer address of the local application; and
storing a communication data between the local application and the remote application using the first address of the local application.

2. The method of claim 1, further comprising:
determining whether the first address assigned to the local application is changed; and
in case that the first address assigned to the local application is changed to a second address, updating a portion of the communication data associated with the first address by replacing the first address into the second address.

3. The method of claim 1, wherein the first address assigned for the IPC process is periodically changed at every predetermined time.

4. The method of claim 1, further comprising:
receiving a request for an access to the communication data from an external application;
determining whether the external application is authorized to have access to the communication data; and
in case that the external application is authorized to have access to the communication data, transmitting the communication data to the external application.

5. The method of claim 1, wherein the communication data comprises any one or any combination of a hyperlink, a uniform resource locator (URL), a uniform resource name (URN), and any data transfer request from the local application to the remote application.

6. The method of claim 1, wherein the IPC process is performed on a distributed IPC facility (DIF) layer.

7. The method of claim 6, wherein the local application is registered to the DIF layer by binding a local application name with the first address for the IPC process, and a binding relation is disseminated via the DIF layer.

8. An apparatus comprising:
a memory configured to store one or more instructions; and
at least one processor configured to execute the one or more instructions to:
assign a first address for inter process communication (IPC) process to a local application, the first address being used as an identifier of the local application instead of an IP address of the local application,
receive a request from a local application for a connection to a remote application using the first address corresponding to the local application,
store a routing table that maps the first address of the local application and an address of the remote application in a network layer,
generate a connection between the local application and the remote application using the routing table to conceal a network layer address of the local application, and
store a communication data between the local application and the remote application using the first address of the local application.

9. The apparatus of claim 8, wherein the at least one processor is further configured to:
determine whether the first address assigned to the local application is changed, and
in case that the first address assigned to the local application is changed to a second address, update a portion of the communication data associated with the first address by replacing the first address into the second address.

10. The apparatus of claim 8, wherein the first address assigned for the IPC process is periodically changed at every predetermined time.

11. The apparatus of claim 8, wherein the at least one processor is further configured to:
receive a request for an access to the communication data from an external application,
determine whether the external application is authorized to have access to the communication data, and
in case that the external application is authorized to have access to the communication data, transmit the communication data to the external application.

12. The apparatus of claim 8, wherein the communication data comprises any one or any combination of a hyperlink, a uniform resource locator (URL), a uniform resource name (URN), and any data transfer request from the local application to the remote application.

13. The apparatus of claim 8, wherein the IPC process is performed on a distributed IPC facility (DIF) layer.

14. The apparatus of claim 13, wherein the at least one processor is further configured to:
register the local application to the DIF layer by binding a local application name with the first address for the IPC process, and
disseminate a binding relation via the DIF layer.

15. At least one non-transitory recording medium having recorded thereon a program, which when executed by an apparatus to execute a method of controlling communication in a network, the method comprising:
assigning a first address for inter process communication (IPC) process to a local application, the first address being used as an identifier of the local application instead of an IP address of the local application;
receiving a request from a local application for a connection to a remote application using the first address corresponding to the local application;
storing a routing table that maps the first address of the local application and an address of the remote application in a network layer;
generating a connection between the local application and the remote application using the routing table to conceal a network layer address of the local application; and
storing a communication data between the local application and the remote application using the first address of the local application.

16. The at least one non-transitory recording medium of claim 15, the method further comprising:
determining whether the first address assigned to the local application is changed; and
in case that the first address assigned to the local application is changed to a second address, updating a portion of the communication data associated with the first address by replacing the first address into the second address.

17. The at least one non-transitory recording medium of claim 15, wherein the first address assigned for the IPC process is periodically changed at every predetermined time.

18. The at least one non-transitory recording medium of claim 15, the method further comprising:
receiving a request for an access to the communication data from an external application;
determining whether the external application is authorized to have access to the communication data; and
in case that the external application is authorized to have access to the communication data, transmitting the communication data to the external application.

19. The at least one non-transitory recording medium of claim 15, wherein the communication data comprises any one or any combination of a hyperlink, a uniform resource locator (URL), a uniform resource name (URN), and any data transfer request from the local application to the remote application.

20. The at least one non-transitory recording medium of claim 15, wherein the IPC process is performed on a distributed IPC facility (DIF) layer and the local application is registered to the DIF layer by binding a local application name with the first address for the IPC process, and a binding relation is disseminated via the DIF layer.

* * * * *